Patented Oct. 30, 1945

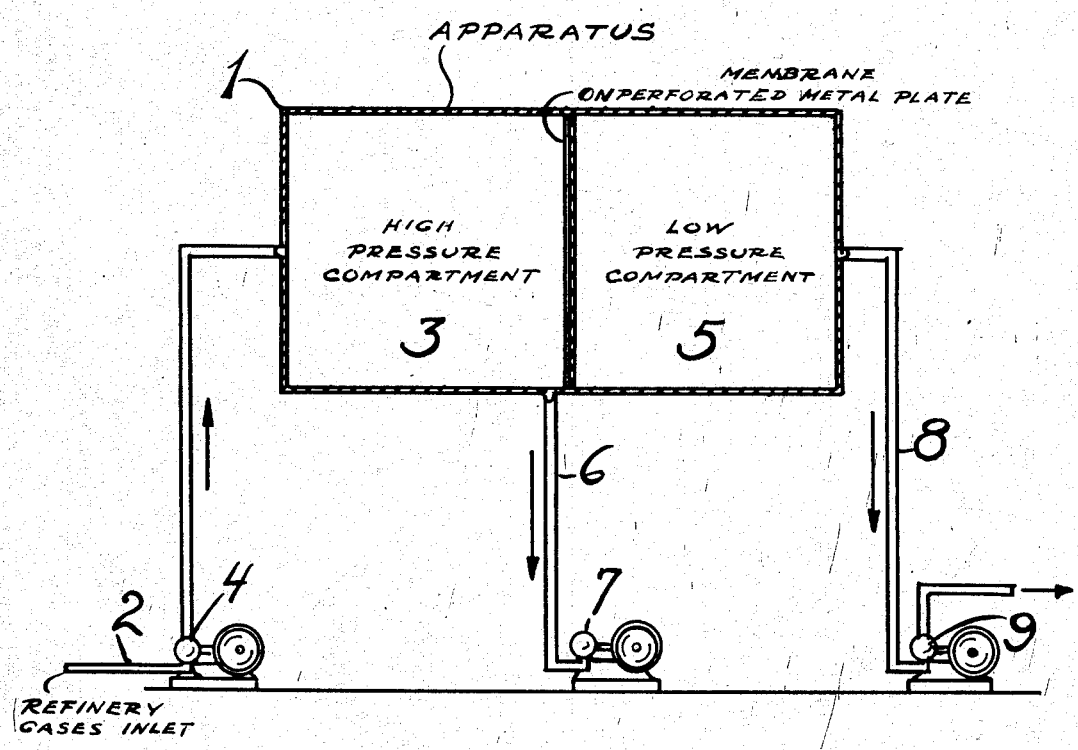

2,388,095

UNITED STATES PATENT OFFICE 2,388,095

REFINING PROCESS

Eldon E. Stahly, Baton Rouge, La., assignor, by mesne assignments, to Jasco, Incorporated, a corporation of Louisiana Application January 25, 1940, Serial No. 315,494

10 Claims. (Cl. 183—115)

The present invention relates to the refining of mineral oils. The invention is particularly directed to a method of refining gases derived in the processing of petroleum oils by which it is possible to economically segregate the gases into their respective constituents which are generally utilized as intermediate agents for the production of additional valuable products. In accordance with the present process, these gases are concentrated into their respective constituents by selective absorption utilizing as a solvent a solid high molecular weight substance secured by polymerizing relatively low molecular weight hydrocarbons. The method and solvent of the present invention are particularly adapted for segregating iso-olefins from normal olefins.

In the refining of petroleum oils, it is very desirable that the gaseous products be concentrated into fractions relatively rich in a particular constituent in order to produce feed stocks which are satisfactory for various related processes, as for example, polymerization operations, alkylation operations, and the like. It is essential that the feed stocks be of a relatively high quality since otherwise these processes could not be economically operated. For example, in the production of high molecular weight polymer products from isobutylenes, it is desirable in certain operations that the feed stock comprise essentially isobutylene or that in similar processes or in alkylation processes the ratio of isobutylene to other feed constituents be accurately controlled.

Various processes have been suggested for the segregation of unsaturated hydrocarbons from gaseous mixtures comprising saturated hydrocarbons. For example, it is known to separate olefin constituents by dissolving the olefins in a preferential liquid solvent or by reacting the olefin constituents with various reagents. The olefins are then recovered after the reagent or solvent is separated from the paraffinic constituents. It is also known to separate saturated hydrocarbon gases from unsaturated hydrocarbon gases utilizing as a solvent a rubber membrane. However, this material is not satisfactory for separating iso-olefins from normal olefins. I have now discovered a process by which it is possible to economically and efficiently concentrate iso-olefins from normal olefins and from mixtures of hydrocarbon gases containing the same. The process of my invention comprises continuously absorbing iso-olefins from mixtures of gases containing the same, utilizing as a selective solvent a solid high molecular weight substance which has been produced by polymerizing relatively low molecular weight hydrocarbons.

The process of my invention may be readily understood by reference to the attached drawing illustrating one modification of the same. Refinery or equivalent gases comprising iso-olefinic and normal olefinic constituents are introduced into apparatus 1 by means of feed line 2. These gases are introduced into high compression compartment 3 of apparatus 1, the pressure of which is maintained at the desired degree by a compressor 4. High pressure compartment 3 is separated from a low pressure compartment 5 by means of a solid membrane of the present invention, preferably maintained on a perforated metallic plate. The membrane of the present invention selectively absorbs the iso-olefins and a mixture having a relatively low concentration of iso-olefins and a high concentration of normal olefins is, therefore, withdrawn from high pressure compartment 3 by means of line 6. This gas mixture may be further compressed for further processing by means of compressor 7 or may be utilized as feed for a dehydrogenation unit or disposed of in any other desirable manner. The dissolved iso-olefins pass through the membrane and are revaporized in low pressure compartment 5. The gases from low pressure compartment 5 relatively rich in iso-olefins and relatively poor in normal olefins are withdrawn by means of line 8, compressed, if desired, in compressor 9, and then utilized for any desirable purpose, as for example, as feed gases for polymerization plants, alkylation plants, and the like.

The process of my invention may vary widely. The selective solvent comprises a solid high molecular weight substance secured by the polymerization of a relatively low molecular weight substance. Preferred solvents are substantially saturated high molecular weight hydrocarbon polymers having molecular weights in the range from about 1,000 to 300,000, preferably in the range of above 30,000. These polymers are characterized by having a relatively long hydrocarbon chain, the carbon atoms of which are all completely saturated with the exception of a single double bond or relatively few double bonds. The molecular weights of the solid solvents of the present invention are determined by the method described in Staudinger's book, "Die Hockmolekularen Organischem Verbindungen," H. Staudinger, Berlin 1932 Verlag Von Julius Stringer, page 56. The solvent polymer compounds of the present invention are prepared by polymerizing substituted unsymmetrical alpha olefins, especially iso-mono-olefin hydrocarbons, as for example, isobutylene, isoamylene, and the like at low temperatures in the presence of an inorganic halide catalyst. The temperature of polymerization is preferably below 0° C., preferably in the range below −30° C. or even lower, depending upon the particular catalyst or other reaction conditions employed. As a catalyst, boron fluoride has been found particularly satisfactory. Also, boron fluoride mixed with hydrogen fluoride may be used, as well as phosphorous or antimony trifluoride or pentafluoride and aluminum chloride, the latter preferably being in the nascent state as obtained when aluminum is acted upon by hydrogen chloride. In the case of aluminum chloride 3% to 5% of the catalyst may be used, whereas in the case of the previously mentioned boron fluoride catalyst 1% or so may be sufficient. Also, solutions or double compounds of said halides such as with phenol, cresol, and the like may be used. In the polymerization operation, suitable diluents may be used, preferably a volatile material such as pentane or a commercial naphtha which can be readily driven off, if desired, after completion of the polymerization. Inasmuch as such polymerizations are usually exothermic, it is generally desirable to provide some means of cooling the reaction chamber, either externally or internally, as by the use of cooling coils or by the evaporation of a liquefied gas such as propane, etc. The molecular weight is readily controlled by regulating the temperature and duration of the polymerization operation. In general, the higher the molecular weight, the less sticky and tougher and harder is the polymer.

As a particular example of a preferred method of preparing such a polymer, isobutylene is polymerized at a temperature of about −10° C. by bubbling boron fluoride through a solution of isobutylene dissolved in liquefied propane. When the molecular weight reaches about 10,000 or 15,000 the reaction is stopped and any catalyst remaining dissolved or suspended in the liquid is removed by washing the reaction product with water or dilute caustic soda. The volatile solvent is then removed by distillation, leaving a colorless plastic polymer as residue. This polymer is somewhat tacky and plastic, is soluble in hydrocarbon solvents and mineral oils, is insoluble in water, is quite resistant to oxidation, and does not harden substantially with age as do some materials which have a fairly high content of unsaturated linkages. My polymer solvents have iodine numbers in the range below about fifteen, often as low as three or five or lower. When freed of unsaturated low molecular weight impurities by known methods, their iodine numbers generally do not exceed a value of five as determined by the Hanus method. For example, a polyisobutylene product having an average molecular weight of about 13,000, comprising substantially no constituents having molecular weights below about 10,000 and which was purified by precipitation from a solution with dioxan, had an iodine number of 4.7 (cgs.I/gm.). Another polyisobutylene product having an average molecular weight of about 70,000 and comprising substantially no constituents having molecular weights below about 40,000 and which was purified by precipitation from a solution with liquid ethylene, had an iodine number of 1.6. As the polymerization reaction proceeds, the degree of unsaturation is gradually reduced.

A satisfactory solvent for concentrating iso-olefins is a co-polymer product. These co-polymer products may be prepared by polymerizing a mixture of iso-mono-olefin hydrocarbons, as for example, isobutylene and a diolefin product, preferably a conjugated diolefin, as for example, butadiene, isoprene, dimethyl butadiene, and the like. The co-polymer products are similarly prepared at relatively low temperatures using Friedel-Crafts and similar catalysts. These polymers have a uniform consistency or uniform degree of hardness or softness throughout various changes in temperature and are thus particularly adapted for the present process.

The thickness of the solid solvent may vary widely, depending upon the particular polymer product used, the operating temperatures and pressures employed, as well as upon the character of the feed gases and upon the yield and quality of products desired. In general, it is preferred that the wall thickness be sufficient so that a physical rupture will not occur under operating conditions. The wall thickness of the solvent will also be adapted to secure optimum concentration of the gases which will be a function to some extent of general operating conditions. I have found that a wall thickness of from 0.1 mm. to 1 mm. is satisfactory.

In order to further illustrate the present process, the following example is given which should not be construed as limiting the same in any manner whatsoever:

EXAMPLE

A feed gas comprising a mixture of isobutylene, normal butylene and normal butane was treated in the manner described using as solid solvents, a rubber solvent, a high molecular weight polymer secured by polymerizing isobutylene in the manner described, and a co-polymer product. This solvent was disposed between the high pressure and low pressure compartment. The results secured are as follows:

Table 1

[Relative percent increase in concentration]

| Solvent | Rubber | Iso-butylene polymer | Co-polymer |
|---|---|---|---|
| Isobutylene/normal butylene | 0.6 | 15.5 | 1.7 |

From the above data it is readily apparent that the solvents of the present invention are particularly adapted for segregating iso-olefins from normal olefins.

The present process may be widely varied. Under certain conditions it may be desirable to employ a multi-stage operation in which the gases withdrawn from the initial stage are contacted with fresh solvent in order to further concentrate the same. Recycling of the gas stream may be employed or various diluents likewise used in order to increase the efficiency of the operation.

The process of the present invention is not to be limited by any theory or mode of operation, but only in and by the following claims in which it is desired to claim all novelty in so far as the prior art permits.

I claim:

1. Process for the segregation of iso-olefins from gases containing the same, comprising contacting said gases with a solid, high molecular weight, substantially saturated aliphatic polymer solvent which has been produced by polymerizing relatively low molecular weight mono-iso-olefinic hydrocarbons, under conditions to selectively dissolve said iso-olefins, followed by recovering said iso-olefins from said solvent.

2. Process in accordance with claim 1 in which said solvent is a polymerized iso-butylene having a molecular weight in the range above about 30,000.

3. Process in accordance with claim 1 in which said solvent is a polymer having a molecular weight in the range above about 30,000 which is produced by polymerizing an iso-olefin and a conjugated diolefin.

4. Improved process for producing a gas fraction having a relatively high concentration of iso-olefins from feed gaseous mixtures comprising iso-olefins and normal olefins, comprising contacting said feed gases with a solid, high molecular weight, substantially saturated aliphatic polymer solvent which has been produced by polymerizing relatively low molecular weight mono-iso-olefinic hydrocarbons, under conditions in which the iso-olefins are dissolved, recovering said iso-olefins from said solvent.

5. Process in accordance with claim 4 in which said solvent is a polymerized iso-butylene having a molecular weight in the range above about 30,000.

6. Process in accordance with claim 4 in which said solvent is a polymer having a molecular weight in the range above about 30,000 which is produced by polymerizing an iso-olefin and a conjugated diolefin.

7. Process in accordance with claim 4 in which said iso-olefin is iso-butylene and in which said normal olefin is normal butylene.

8. Continuous process for the production of a gaseous fraction having a relatively high concentration of iso-olefins from feed gas mixtures containing the same, comprising passing said feed gases into a high pressure vessel and contacting the same with a solid, high molecular weight, substantially saturated aliphatic polymer solvent produced by polymerizing relatively low molecular weight mono-iso-olefinic hydrocarbons, under conditions to dissolve the iso-olefins in said solvent, withdrawing the treated gases from said high pressure vessel, revaporizing said dissolved iso-olefins from said solvent in a low pressure vessel and withdrawing the same from the system.

9. Process in accordance with claim 8 in which said solvent is a polymerized iso-butylene having a molecular weight in the range above about 30,000.

10. Process in accordance with claim 8 in which said solvent is a polymer having a molecular weight in the range above about 30,000 which is produced by polymerizing an iso-olefin and a conjugated diolefin.

ELDON E. STAHLY.